United States Patent [19]

Miles

[11] 4,277,170
[45] Jul. 7, 1981

[54] LASER BEACON AND OPTICAL DETECTOR SYSTEM FOR AIRCRAFT COLLISION HAZARD DETERMINATION

[76] Inventor: Richard B. Miles, D-16 Millstone River Apts., Princeton, N.J. 08540

[21] Appl. No.: 90,497

[22] Filed: Nov. 1, 1979

[51] Int. Cl.³ .................. G01B 11/26; G01C 3/00; G01C 5/00
[52] U.S. Cl. .................. 356/152; 340/27 NA; 350/96.18; 350/96.25; 356/1; 356/4
[58] Field of Search .................. 356/1, 4, 152; 343/100 PE, 106 R, 112 CA; 340/25, 27 NA; 350/96.25, 96.18

[56] References Cited

U.S. PATENT DOCUMENTS

| | | | |
|---|---|---|---|
| 2,578,241 | 12/1951 | Guanella | 343/100 PE |
| 3,203,305 | 8/1965 | Fairbanks | 356/4 |
| 3,400,398 | 9/1968 | Lapeyre et al. | 343/106 R |
| 3,572,928 | 3/1971 | Decker et al. | 356/4 |
| 3,609,677 | 9/1971 | Marberg | 340/25 |
| 3,610,755 | 10/1971 | Wieberger | 356/4 |
| 3,620,626 | 11/1971 | Daly et al. | 356/4 |
| 3,652,981 | 3/1972 | Campanella | 343/112 CA |
| 3,662,180 | 5/1972 | Jorgensen et al. | 356/152 |
| 3,687,556 | 8/1972 | Price et al. | 356/1 |
| 3,699,511 | 10/1972 | Fletcher et al. | 340/27 NA |
| 3,710,098 | 1/1973 | Walden | 340/25 |
| 3,720,468 | 3/1973 | Skagerlund | 356/4 |
| 3,721,950 | 3/1973 | Jorgensen | 343/106 R |
| 3,736,559 | 5/1973 | Trageser et al. | 340/27 R |
| 3,799,675 | 3/1974 | Johnson et al. | 356/152 |
| 3,802,780 | 4/1974 | Helm et al. | 356/152 |
| 3,846,746 | 11/1974 | Trageser et al. | 340/27 R |
| 3,897,151 | 7/1975 | Lecroy | 356/5 |
| 3,903,501 | 9/1975 | Greenlee et al. | 340/25 |
| 3,937,557 | 2/1976 | Milton | 350/96.18 |

OTHER PUBLICATIONS

C. H. Leigh et al., Proc. of IEEE, vol. 58, #3, 3-1970.
R. T. Daly, Proc. of IEEE, vol. 58, #3, 3-1970.

*Primary Examiner*—S. C. Buczinski
*Attorney, Agent, or Firm*—Richard C. Woodbridge

[57] ABSTRACT

A laser beacon mounted on a first aircraft emits a beam which is sensed by an optical detector on a second aircraft in such a manner that a collision proximity warning device is triggered and/or collision avoidance maneuvers are initiated. The system is intended to prevent aircraft collisions which occur under visual flight regulation (VFR) conditions and which constitute in excess of 90% of civil aircraft mid-air accidents. In the preferred embodiment a horizontally collimated, vertically diverging laser beam is made to rotate 360° in polarization while simultaneously rotating 360° in azimuth with respect to the first aircraft. The optical detector mounted on the second aircraft preferably comprises a pair of horizontally offset light collectors which include narrow spectral width filters respectively and various other components which collectively determine the bearing, range and relative heading of the first aircraft. The information is stored so that subsequent signals arising from the first aircraft may be compared to determine trajectories and range rates. Collision warning and/or collision avoidance actions may then be started if the information indicates a high probability of collision. Alternative embodiments of the optical detector apparatus can be constructed with varying complexities to meet the needs of aircraft operating at different speeds or in different flight environments.

8 Claims, 12 Drawing Figures

LASER BEACON AND OPTICAL DETECTOR SYSTEM FOR AIRCRAFT COLLISION HAZARD DETERMINATION

BACKGROUND OF THE INVENTION

1. Field of the Invention

This invention relates to an aircraft proximity warning and collision avoidance system wherein a first aircraft carries a laser beacon and a second aircraft carries an optical detection device designed to alert the pilot of a potential collision threat and provide collision avoidance information if desired.

2. Description of the Prior Art

Studies by both the Federal Aviation Administration and the United States Air Force have shown that well over 90% of general and commercial aircraft mid-air collisions have occurred under visual flight conditions. Most of these collisions occurred between two general aviation aircraft flying during the daytime in good weather. When the weather is poor, fewer aircraft are in the air, and most of those are flying under instrument flight regulations (IFR). Although IFR aircraft are spaced from one another, collisions with aircraft flying under visual flight regulations (VFR) in marginal weather conditions or between weather systems also constitute a serious threat. Therefore a device to provide proximity warning and/or collision avoidance information to planes flying either VFR or IFR in weather conditions equal to or better than VFR flight minimums (three mile visibility) would have a strong impact on aircraft protection from mid-air collisions.

For years, flashing lights have been used for both aerial and marine navigation, providing the observer with a method for determining the bearing to the potential hazard. Most aircraft are now equipped with bright flashing strobe beacons as well as less intense red flashing beacons and various navigational lights as visual aids to avoid collisions. The effectiveness of such aircraft lights depends on the ability of the pilots of other aircraft to see them. Therefore, they are essentially of no use during the daytime. Furthermore such lights are ineffective when they are out of a pilot's field of view or when the pilot is otherwise coupled and is not looking out of the cockpit.

Electronic means for detecting such beacons have been considered by Campanella, U.S. Pat. No. 3,652,981, and by Leigh and Richardson, Proceedings of the IEEE, Volume 58, page 462. In both of those disclosures a detector or detector array is mounted so that a high intensity flashing strobe light from another aircraft can be electronically sensed. Collision probability in both of these cases is determined by the bearing of the threat aircraft relative to the aircraft with the detector system herein designated the protected aircraft. Although these inventions alleviate the need for visual contact by the pilot, they are seriously limited in daytime operation by the sun and reflected sunlight from clouds or terrain. This limitation occurs because the strobe emits light over a broad spectral range so effective spectral filtering against sunlight is not feasible. A further limitation of these inventions is their unique dependence on the bearing of the threat aircraft from the protected aircraft for determination of collision probability. Other such parameters as range, heading of the threat aircraft with respect to the protected aircraft, and time to collision cannot be determined. Large "false alarm" indications may subsequently occur.

A narrow spectral width laser navigational beacon is described in U.S. Pat. No. 3,710,098 for Walden. That beacon configuration was designed to enhance visual observation of the flash at a distance. A horizontally collimated beam and narrow spectral width are features which strongly enhance the electronic detectability of a beacon in the presence of background daylight.

A light beacon can be constructed to yield the heading of a threat aircraft with respect to a protected aircraft. When coupled with bearing to the threat aircraft, this information would further enhance the ability of such a system to predict collision probability. Greenlee et al, U.S. Pat. No. 3,903,501, discloses a modified aircraft strobe light system for providing a distinctive flash pattern in the forward direction so other aircraft will know that the beacons are mounted on an aircraft headed toward them. Nerberg, U.S. Pat. Nos. 3,609,677, Jorgensen et al, 3,721,950, Jorgensen et al, 3,662,180, and Johnson et al, 3,799,675, describe flashing beacons which, by time separation or intensity variation between two observed pulses, indicate the bearing of the observer from the beacon. In addition, Trageser et al, U.S. Pat. No. 3,846,746, discloses a strobe light based collision avoidance system in which the pulse repetition rate is actively varied to indicate the altitude and/or heading of the threat aircraft. Pulse time separation measurements systems run into difficulty when several threat aircraft fall in the same detected region. In such a circumstance the electronic observation of the various flashes may yield spurious results. Intensity variation measurements between two pulses also cannot easily cope with more than one aircraft within the observed region. Furthermore, intensity variations naturally occur due to atmospheric fluctuations, so further complications in information processing arise as is discussed by Johnson et al. In all cases, the beacons described are of broad spectral width and are therefore subject to substantial sunlight interference in daylight operation.

Several inventors have proposed RADAR-like optical devices for collision avoidance or position location. Daly, U.S. Pat. No. 3,620,626, and Proceedings of the IEEE, Volume 58, page 456, disclose such a system operating with a pulsed laser transmitter and detector mounted on the protected aircraft. Threat aircraft carry retroreflectors to enhance the reflected signal intensity. The time between pulse transmission and reception yields the range, and bearing is determined by the direction from which the reflection came. A second pulse provides range rate and redundancy. A similar system for measuring range and position is disclosed by Helm et al, U.S. Pat. No. 3,802,780, wherein a pulse modulated light source mounted on one body is reflected from another and detected on the first body. Intensity variation yields position and time delay yields range. Lecroy, U.S. Pat. No. 3,897,151, discloses a laser miss distance indicator which again uses the round trip time of light pulses to determine the position and trajectory of a missile. Skagerlund, U.S. Pat. No. 3,720,468, also discloses a reflective ranging device.

For use in aerial collision avoidance the foregoing RADAR-like optical devices require retroreflectors on other aircraft in order for signals to be large enough to permit detection over a reasonable range. Therefore, even though they have the advantage that each protected aircraft need not rely on other aircraft beacons, all aircraft must have retroreflectors. Furthermore, the round trip signal loss is large enough that the transmitted pulse must be of substantial energy and may present an eye hazard to ground personnel or nearby aircraft. These systems also cannot determine the heading of the threat aircraft and therefore must rely only on range and bearing information for collision threat determination.

SUMMARY OF THE INVENTION

Briefly described, the invention comprehends the combined use of various properties of a laser to provide the relevant information and false alarm discrimination necessary for aircraft proximity warning and collision avoidance. Spatial coherence (a well defined propagation direction and beam profile), narrow spectral width (almost a single color), and single polarization are all properties which a laser may simultaneously manifest. The laser is preferably mounted on an aircraft with its beam swept around 360° in a horizontal plane.

When detected from afar, the above properties may be combined to provide strong discrimination against background noise and yield the bearing and range from the detector to the laser beacon as well as the bearing from the beacon to the detector. Spatial coherence permits the laser beam to be collimated so that high pulse intensities are obtained thereby allowing accurate signal discrimination against the rather constant background light from the sky. The spectral width of the laser is on the order of one millionth of the visible spectrum, so an optical filter may be used to further discriminate against background light. The bearing to the beacon is then determined by ascertaining in what region of the sky the beacon is detected. As the beacon sweeps past the detector, the sweep time may be used to determine range. By measuring the observed polarization of the laser beacon, the bearing from the beacon to the detector may be found.

Although a very high repetition pulsed or a continuous laser is used, after the beam is expanded and swept around the transmitting aircraft a single bright flash will be observed by eye from afar once each rotation time if the laser emits visible light. Therefore it is a feature of this invention that the transmitter may be used as a visible flashing beacon perhaps replacing the present rotating beacon currently installed on many aircrafts. In particular, if the presently available low cost helium-neon laser is chosen and operated at the proper frequency, its beacon has the appearance of a strobe light flashing with the color of "aviation red". It should be noted that unless an unusually high power laser is selected the perceived brightness of the flashing laser will not exceed that of presently used strobe lights and therefore should not be considered a substitute for them.

The first component of this invention is the laser transmitter assembly. A laser is chosen whose output wavelength is in a region of low atmospheric attenuation and whose output beam quality is sufficiently high so the laser may be collimated or focused in the far field. The laser must also operate with a narrow spectral output and a well-defined polarization. In order to make this collision avoidance and proximity warning system viable, the laser should also be low cost, rugged, and reliable. Lasers such as the helium-neon laser, or carbon-dioxide laser would be appropriate. In order to avoid such complexities as detector cooling and to take advantage of the added visual beacon feature, a helium-neon laser operating in red at 0.6328 microns wavelength is preferred. Such lasers are presently reliable, rugged, and capable of operating for many thousands of hours without servicing. Furthermore they are low cost and consume little power so their installation on the general aviation fleet is a practical possibility.

The laser is used to illuminate all the surrounding space which would constitute a high probability collision threat to the aircraft with the transmitter. It will be appreciated by those knowledgeable in the field that with a constant average power and pulse repetition rate, the electronic detectability increases as the pulse length decreases. That is to say, a short pulse time high intensity flashing light is much more detectable than a long pulse time low intensity or a continuous light emitting the same total average power. In order to make the laser appear to flash with as short a pulse as possible, the beam is first collimated and then reflected from a rotating cylindrical mirror so that it forms a shape similar to a "Japanese fan" rotating about the aircraft. The beam therefore is diverging at a wide angle in the vertical direction, yet is collimated or even focused somewhat in the horizontal direction. In this manner it may be observed by other aircraft, both above and below the transmitter, and is seen as a bright flash with each rotation.

It will also be appreciated that the distance over which the laser beam may remain collimated in the horizontal direction is directly related to the horizontal size of the beam at the transmitter. For example, a red laser beam with a horizontal width of several centimeters at the transmitter will remain approximately the same width for several kilometers. In that case the time duration of the flash is inversely proportional to the distance from the beacon for that region over which the beam remains horizontally collimated.

If the laser beam is polarized in a constant direction at the source, its polarization will be caused to rotate by the reflection from the rotating cylindrical mirror. For example, if the source laser is directed straight up and polarized along the axis of the transmitting aircraft, light reflected directly forward or directly aft will be vertically polarized. On the other hand, light reflected directly abeam will be horizontally polarized. A protected aircraft with a polarization sensitive detection system can therefore determine the heading of the threat aircraft with respect to his location with a 180° uncertainty. Only a single observed pulse is necessary to determine this information.

If the cylindrical mirror is rotated at a constant rate which for the sake of discussion is chosen to be one revolution per second, then the fan-shaped beam will sweep all that airspace from which a collision is most likely to occur once each second. A constant angular rate permits the determination of range information by simple geometry. If the protected aircraft has two detectors mounted a known horizontal distance from one another, then the time delay between when the first sees the pulse and when the second sees the pulse will be inversely proportional to the distance between the aircraft. Range sensitivity will be enhanced by a wider separation between the two detectors. A horizontal separation of one meter will produce two several microsecond pulses separated by 160 microseconds for a one revolution per second sweep. This time separation is short enough so many aircraft can be within the same detected region without undue probability of interference. The protected aircraft has the opportunity to update and integrate the parameters once each second, so range rate and relative heading and bearing variations may be compiled. From this information both aircraft trajectories, collision probability and time to collision may be computed.

It should be noted that in this system there are numerous discriminators and consistency checks to eliminate false alarms. The first discriminator is a narrow spectral width optical filter which removes background light due to the sun or other sources. Following the optical filter is an electronic discriminator which will pass only pulses of light having a time behavior similar to the anticipated laser signal. The delayed pulse arriving from the horizontally offset collector network allows for further discrimination. First that pulse must arrive within some fixed time after the initial pulse or the initial pulse may be considered spurious. Second the polarization of the second pulse must be consistent with that of the initial pulse or again the initial pulse may be considered spurious. Third, the second pulse must come from the same point in the sky. A final consistency check is made one second later when the next pair of pulses is processed. It is particularly important to have this wide range of discriminators and consistency checks so that no one discrimination step need be relied on too heavily.

Various embodiments of this pilot warning and collision avoidance system may be selected depending on the sophistication desired and such other factors as cost, aircraft speed and operating environment. For example, single engine general aviation aircraft operating predominantly in uncontrolled airspace may best be served by a pilot warning system which simply indicates the presence of and bearing to another aircraft within some fixed distance. Another system may be chosen with warning limited to only those aircraft within a certain distance.

DETAILED DESCRIPTION OF THE INVENTION

During the course of this description like numbers will be used to identify like elements according to different figures illustrating the invention.

The various embodiments of this invention described here may use the same laser beacon transmitting device but differ in the receiving device with regard to the information collected and the manner in which it is processed. These embodiments are intended to indicate a broad range of levels of sophistication within which this invention may be practiced. The preferred embodiment is described in the paragraphs immediately below.

Figure 1:
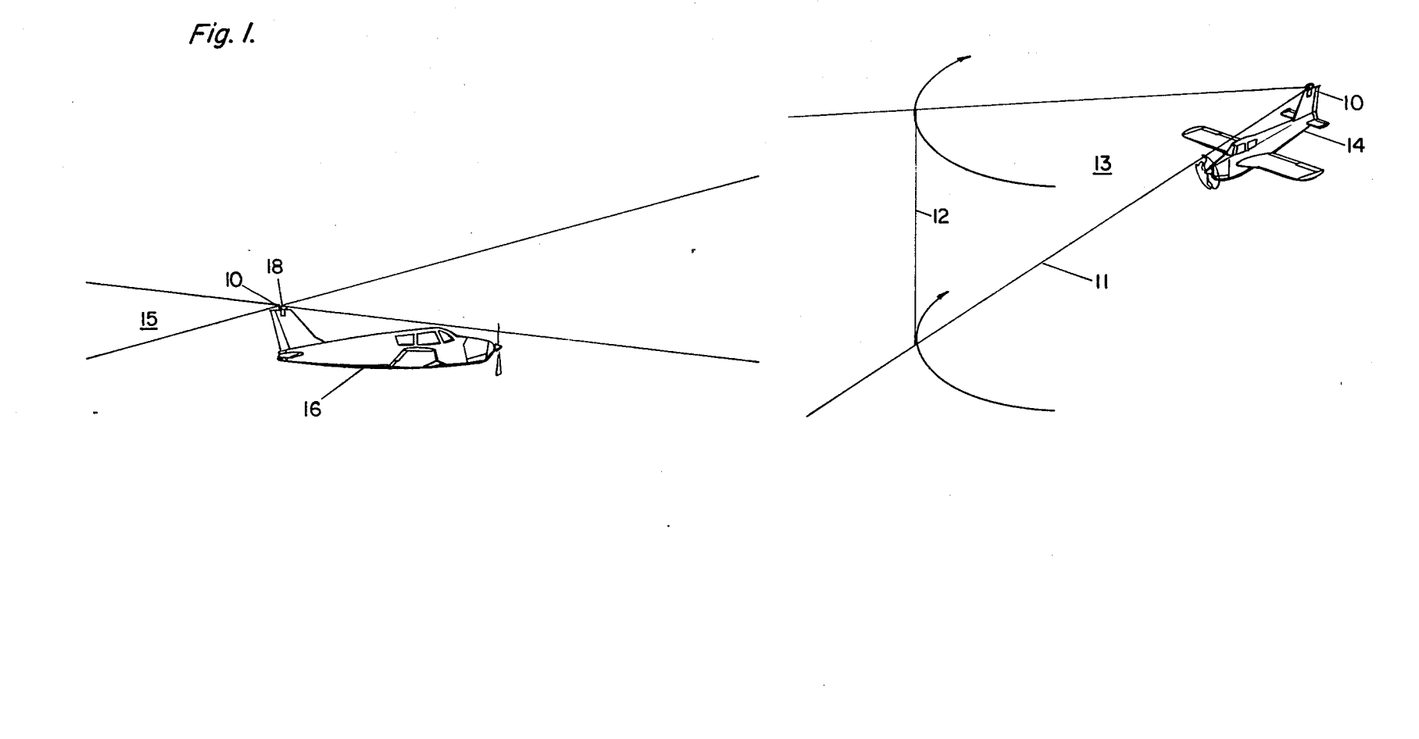
FIG. 1 is an illustration of two aircraft on a possible collision trajectory indicating the scan profile of the laser beacon apparatus from one aircraft and the optical detection apparatus on the other.

As illustrated in FIG. 1, all aircraft operating in a protected zone will have mounted on their tail or some other location a laser beacon apparatus 10. The transmitted beam profile 12 from one of these aircraft 14 is shown in the figure. The beam 11 is swept so that it periodically illuminates all the space 13 into which this aircraft most probably constitutes a threat. All protected aircraft 16 flying in this airspace have mounted on them an optical detector apparatus 18 which observes the space 15 from which a threat aircraft 14 will most probably arrive.

Figure 2:
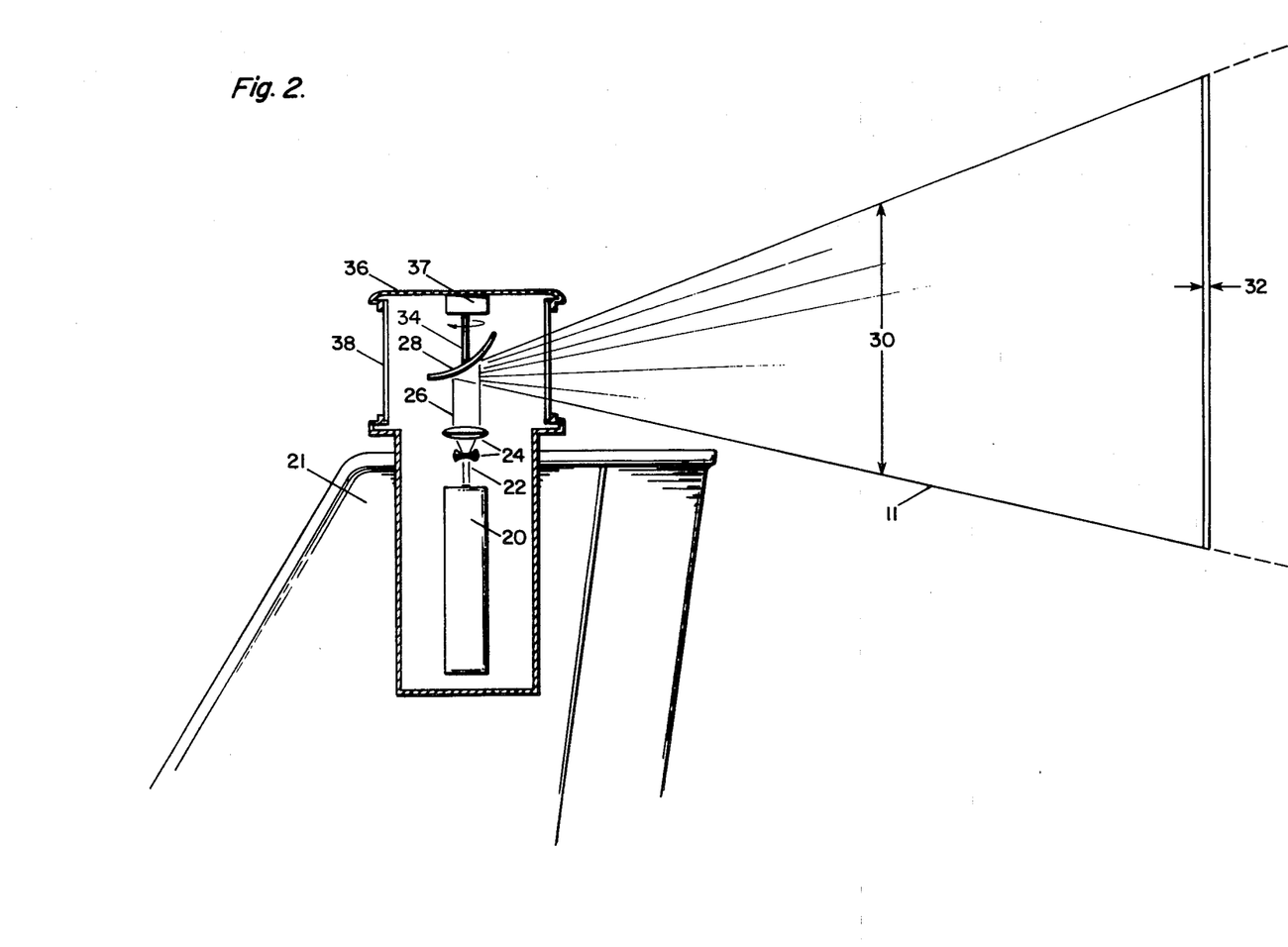
FIG. 2 is a detailed illustration of the laser beacon apparatus.

In FIG. 2 a detailed illustration of the laser beacon apparatus 10 is presented. A polarized helium-neon laser 20 is mounted on the aircraft tail 21 such that its polarization lies along the fore-aft axis of the aircraft and its beam 22 emerges in a vertical direction. The beam 22 then passes into an optical beam expander-collimator assembly 24 and emerges as a well-collimated beam 26 with a diameter of several centimeters from the beam center to the one-half intensity point. The collimated beam 26 is then reflected off a cylindrical mirror 28 such that the resultant beam 11 is diverging in the vertical direction 30 yet remains collimated in the horizontal direction 32. The cylindrical mirror 28 is rotated about a horizontal axis 34 by a motor 37 such that the "Japanese fan" shaped beam 11 scans 360° about the aircraft 14 each time mirror 28 rotates. Due to the reflection geometry of mirror 28, the polarization of beam 11 rotates 360° each time it sweeps around the aircraft 14. Laser beacon apparatus 10 is mounted in a protective housing 36 with a 360° transparent window 38. From afar beam 11 is then seen to be a vertical line with a constant angular sweep rate and polarization angle from vertical angle to the azimuthal angle from the fore-aft axis of the transmitting aircraft 14.

Figure 3:
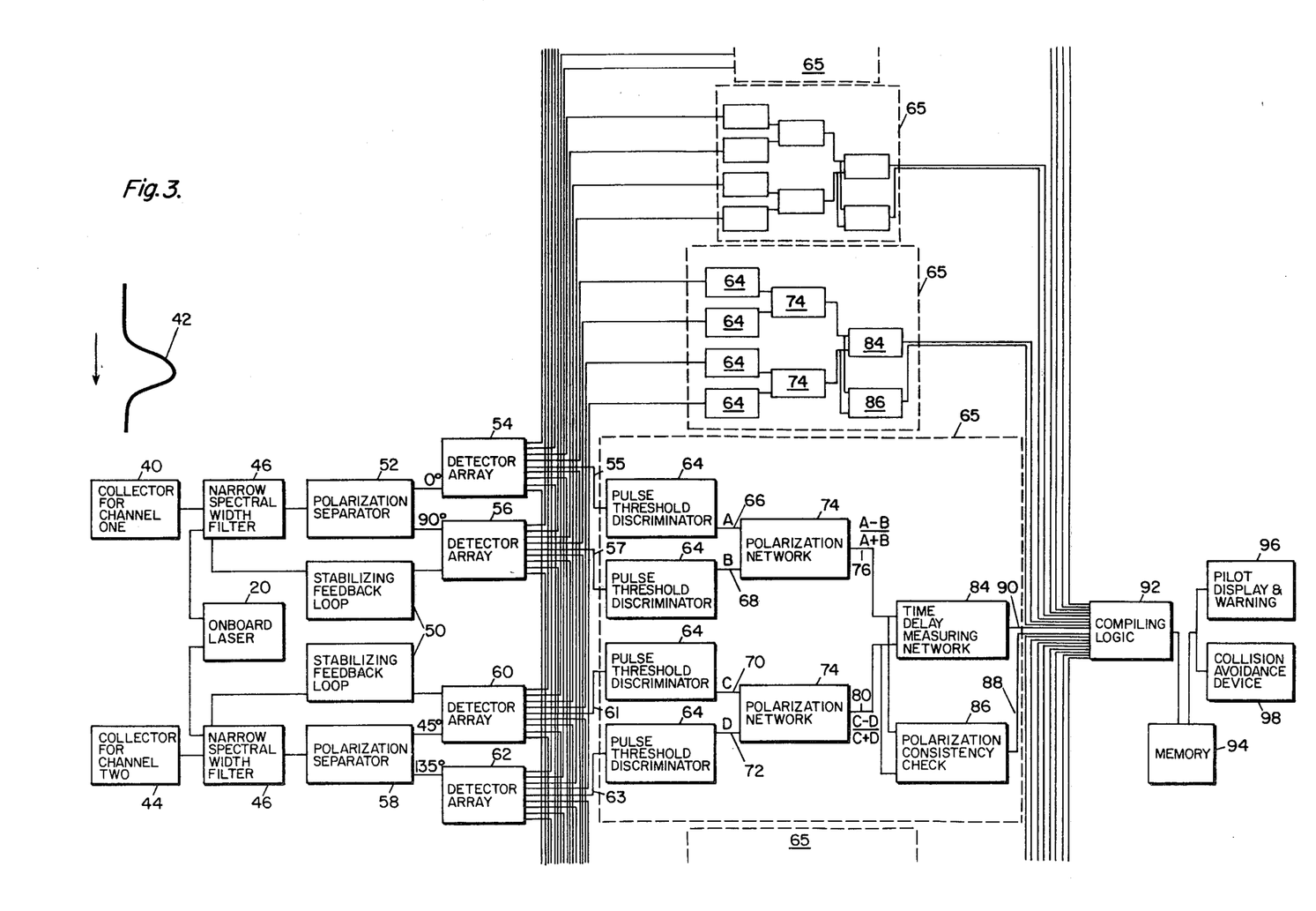
FIG. 3 is a block diagram showing the optics, electronics, and output associated with the preferred embodiment of the optical detection apparatus.

The optical detector apparatus 18 mounted in the protected aircraft 16 is shown in the block diagram of FIG. 3. Each of the separate components of this apparatus are further detailed in subsequent figures. According to the preferred embodiment, two horizontally offset collector systems are included to permit range identification from the sweep time $\Delta T$. The collector 40 for Channel One sees the pulse 42 sweep past at time $T_1$. The pulse 42 at some subsequent time $T_2$ sweeps past the collector 44 of Channel Two generating a time delayed signal whose delay $\Delta T$ is inversely proportional to the distance of the threat aircraft 14. Each of these pulses after collection is passed into a narrow spectral width filter 46. A small amount of light from the onboard laser transmitter 20 associated with the protected aircraft's own laser beacon 10 is used as a frequency standard $f_L$. The narrow spectral width filter 46 is actively tuned to $f_L$ by the feedback loop 50. Following the spectral filter 46 the pulse from Channel One is passed through a polarization separator 52 such that vertically polarized light is detected by a detector array 54 and horizontally polarized light is detected by another array 56. The pulse from Channel Two passes into a 45° offset polarization separator 58 and the 45° off vertical signal is detected by an array 60 and the 135° off axis signal by another array 62. Any given sector of the sky is simultaneously observed by one element each of array 54, 56, 60 and 62 respectively. Outputs from each sector are collected together and fed to an associated signal processor 65. Lines 55, 57, 61 and 63 carry signals from one particular sector into the signal processor 65 where they are first fed into threshold discriminators 64 to eliminate background noise. The four outputs are shown following these discriminators 64: at $T_1$ output A is vertically polarized and output B is horizontally polarized; at $T_2$ output C is 45° off vertically polarized and D is 135° off vertically polarized. Pulses A and B at $T_1$ are then fed via lines 66 and 68 to the polarization network 74 and pulses B and D at $T_2$ are fed via lines 70 and 72 to a similar polarization network 74. The polarization networks 74 determine the polarization of the detected light pulses. This may be accomplished in a variety of ways, for example, an output such as A−B/A+B would vary between plus one and minus one depending on the polarization. From the discriminators therefore an output of A−B/A+B at $T_1$ and an output of C−D/C+D at $T_2$ are shown in FIG. 3. These two signals are fed via lines 76 and 80 to a time delay measurement network 84 which will determine the delay $\Delta T$ between the pulse arriving from Channel One and that arriving from Channel Two. In addition a consistency check 86 may be performed using the simple trigonometric fact that the sum of the squares of the signals at $T_1$ and $T_2$ must equal one. Valid signals indicate the polarization of the laser beacon 10 to within 180° uncertainty. The polarization 88 and time delay signals 90 from each signal processor 65 are fed into the compiling logic 92 which determines the threat aircraft 14 heading to within 180° directly from the polarization signal, the threat aircraft 14 range from the inverse of the time delay $\Delta T$, and the threat aircraft 14 bearing from the sector of the sky from which the signal came. Prior art minicomputer or microprocessor systems are capable of rapidly sampling the outputs from each signal processor 65 and performing the simple calculations required. This information is then stored in a conventional memory 94. Another set of pulses will arrive when the threat aircraft beacon 10 sweeps by again approximately one second later. Information from these pulses can be compared with that already stored and the range rate of change and trajectories computed. The result is fed to a display and warning device 96 or a collision avoidance device 98.

Figure 4:
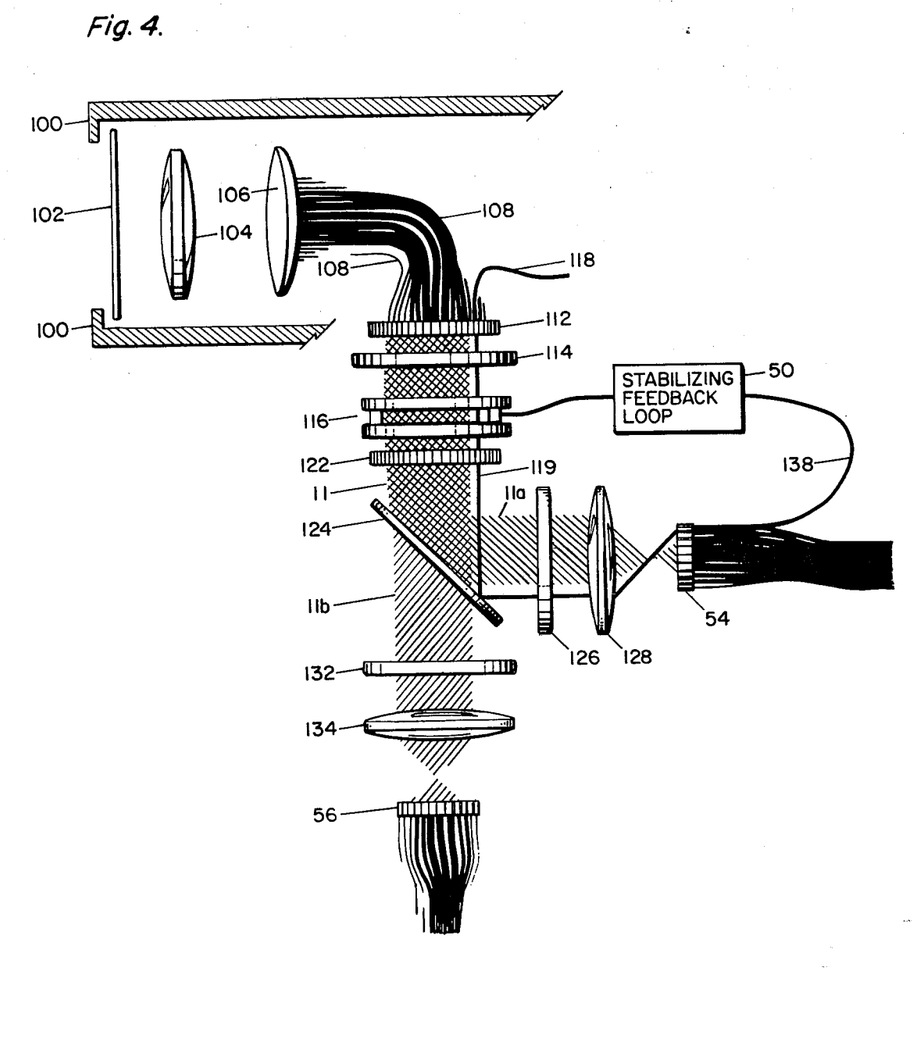
FIG. 4 is a detailed illustration of the collection optics of the preferred embodiment of the optical detection apparatus.

A more detailed diagram of the optical components of Channel One are shown as an exploded view in FIG. 4. The collector optics 40 are contained within a detector housing 100, which is fitted with a preliminary optical filter 102 to screen out background light and selectively pass the laser light. This filter is followed by a collection lens 104 with a broad focal region 106 to observe threat aircraft 14 over a wide sector of the sky. A series of fiber optic bundles 108 are arranged to collect the light from the focal field and transfer it to the narrow spectral width filter 46. All the fibers 108 are brought together and a collimating mask 112 is placed over the ends of the fibers 108 to eliminate off-axis rays. The collected light pulse 11 then passes through a passive narrow width spectral filter 114 followed by an actively stabilized interferometric very narrow width optical filter 116. A stabilizing feedback loop 50 sets the interferometric filter 116 at the proper frequency by actively changing its spacing to maximize the throughput of the light beam 119 which is brought from the onboard laser 20 by an optical fiber 118. In this manner the onboard laser acts as a frequency standard. Off axis light is removed by a second collimating mask 122. The polarization separator 52 follows. A 50% light splitter 124 breaks the light emerging from the filter assembly into two components designated as 11a and 11b respectively. Component 11a is passed through a vertical polarizer 126 and focused by a lens 128 onto the vertical component detector array 54. Component 116 is passed through a 90° offset polarizer 132 and again through a lens 134 onto the horizontal component detector array 56. An extra element 138 of one of these arrays is used to drive the feedback loop 50 to keep the filter properly aligned.

Figure 5:
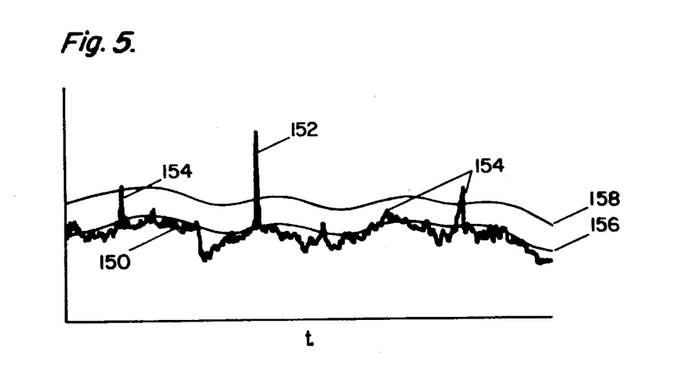
FIG. 5 illustrates the manner in which a pulse discriminator removes noise from a typical output signal from a detector array element.
Figure 6:
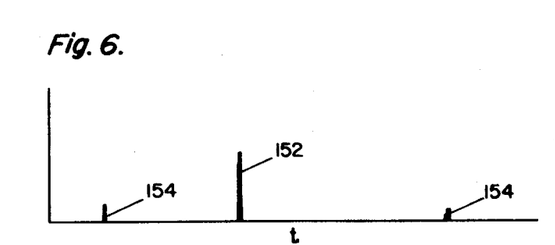
FIG. 6 illustrates the pulse threshold discriminator output with its noise reduced.

A diagram of a typical output signal from one element of the detector array 54 or 56 is shown in FIG. 5. The signal 150 contains a short laser pulse 152 as well as a large amount of fluctuating noise 154. Signal 150 is fed into a pulse threshold discriminator 64 whose behavior is shown in the diagram. The threshold discriminator 64 takes a time average of the detector output for a period of time which is long compared to the laser pulse. This average is shown by the line 156. A threshold level 158 is then set as a constant multiple of the time average 156 such that only those pulses higher than the threshold level 158 are passed out of discriminator 64. The resultant output is shown in FIG. 6 where the signal pulse 152 is now clearly separated. In addition some residual noise pulses 154 will be passed depending on the level 158 of the discriminator 64.

Figure 7:
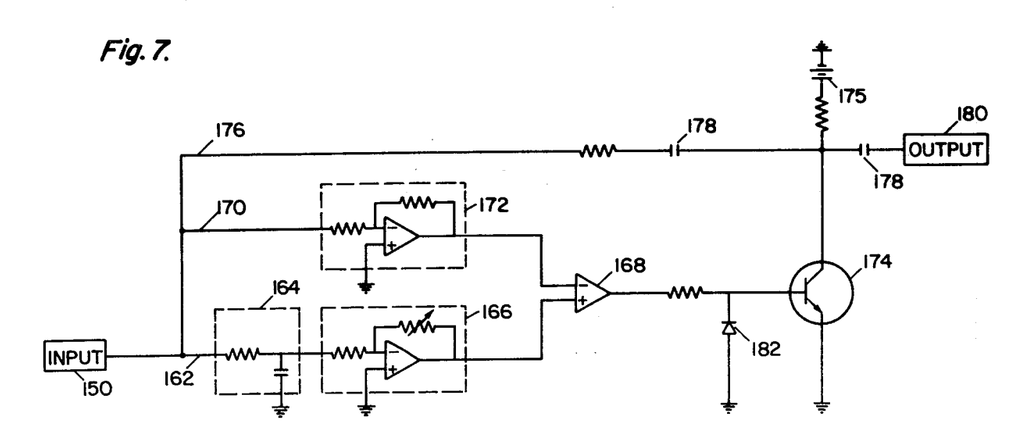
FIG. 7 is a detail diagram of the pulse threshold discriminator.

FIG. 7 is a circuit diagram of such a pulse threshold discriminator 64. The input 150 from the detector array element is split into three lines. The first 162 is fed into a low pass RC circuit 164 with a cutoff frequency chosen so the output 156 of the RC circuit 164 follows the low frequency component of the background noise 154 but eliminates pulses on the time scale of the laser pulse 152. The RC circuit 164 output 156 is then passed through a variable gain fast amplifier 166 which sets the threshold level 158. This threshold level 158 enters the positive side of a comparator device 168. The second branch of the input signal 170 is passed directly through a unity gain amplifier 172 to invert the sign and into the negative side of the comparator 168. When the threshold level 158 is greater than the unfiltered signal 150, the comparator 169 has a positive output which turns the transistor switch 174 to the conducting position and short circuits the input signal 150 from the third branch 176 to ground. On the other hand, if the input signal 150 is greater than the threshold level 158, the comparator 168 has a negative output which opens the transistor switch 174 and allows the signal 150 to pass to the output 180. The DC isolators 178 prevent the transistor bias voltage 175 from affecting other components. The diode 182 protects the transistor switch 174 from the negative output of the comparator 168. By varying the gain of the variable gain amplifier 166 the threshold level 158 can be set and only pulses 152 higher than that level will be transmitted.

Figure 8:
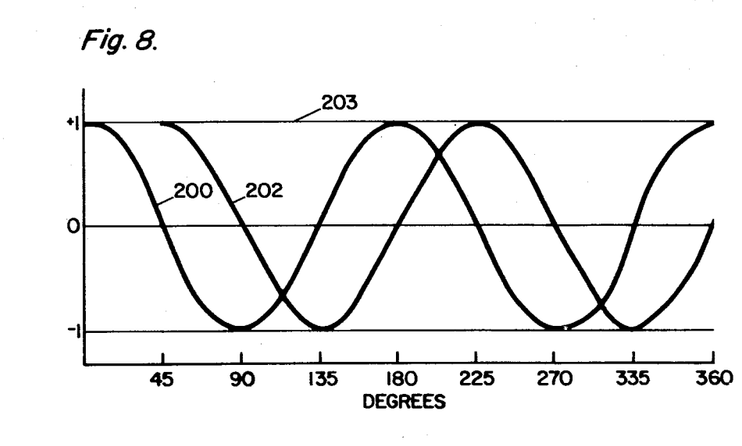
FIG. 8 illustrates how combined signals from various polarization sensitive detector array elements vary as a function of pulse polarization.

Following the pulse threshold discriminator 64 the vertically polarized signal A is sent to polarization network 74 and combined with the simultaneous signal B from the detector element 56 observing the horizontal polarization component. FIG. 8 shows how the polarization information may be interpreted if for example this network determines the polarization of calculating the ratio $A-B/A+B$. The signal $A-B/A+B$ from detector Channel One will then be plus one ($+1$) if the detected beam is vertically polarized. This signal is designated as waveform 200. As a function of the polarization angle of the detected laser pulse from vertical, the signal 200 processed from Channel One will pass through zero to minus one for horizontal polarization and back to plus one when the polarization is 180°, and then repeat the cycle to 360°. The signal $C-D/C+D$ processed from Channel Two is shown to vary in a similar manner but offset by 45° due to the shift of the polarizers placed in front of the detectors in that channel. This signal is designated as waveform 202. The sum 203 of the squares of signals 200 and 202 is shown to add to "one". There is, therefore, a simple method in which a false alarm may be detected: if the sum of the squares is much different than "one" the signal is spurious. Furthermore, by observing the signals processed from Channel One and from Channel Two the polarization of the detected pulse may be determined to within 180 degrees. In this manner the heading of the threat aircraft 14 relative to the protected aircraft 16 may be determined to within 180°.

Figure 9:
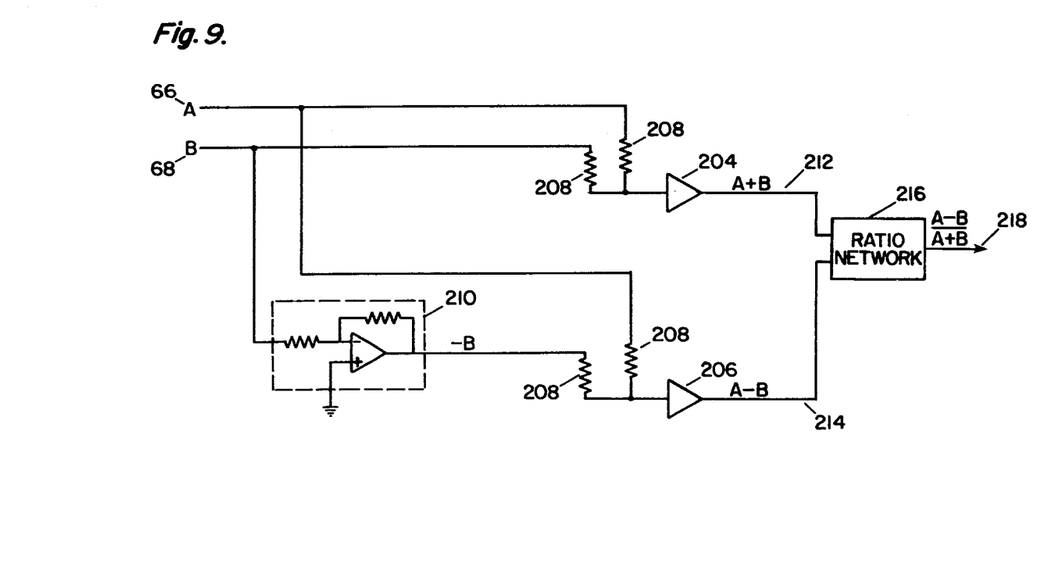
FIG. 9 is a detail diagram of the polarization network.

A simple circuit diagram for such a polarization network is shown in FIG. 9. Signals A and B on lines 66 and 68 from the two orthogonal detector array elements are the inputs. Line 66 is split and signal A is fed directly to both the first 204 and second 206 amplifiers through input resistors 208. Line 68 feeds signal B directly to the first amplifier 204 through an input resistor 208. Line 68 also feeds B to an inverter 210 and then into the second amplifier 206 through an input resistor 208. The output 212 of the first amplifier is $A+B$ and the output 214 of the second amplifier is $A-B$. These two signals are fed into a ratio network 216 which yields the desired output 218 which is $A-B/A+B$.

This disclosure does not describe the electronics or display details associated with suitable prior art pilot warning equipment or the logic or procedures associated with prior art collision avoidance maneuvers. Trageser et al, U.S. Pat. No. 3,736,559, and Fletcher et al, U.S. Pat. No. 3,699,511, have developed suitable pilot warning and display systems. In addition numerous suitable collision avoidance algorithms have been developed, see, for example, the Federal Aviation Administration Report No. FAA-RD/75-72, and the discussion by J. J. Bagnall Jr., in *Navigation: Journal of the Institute of Navigation*, Vol. 23, No. 3, 1976.

Figure 10:
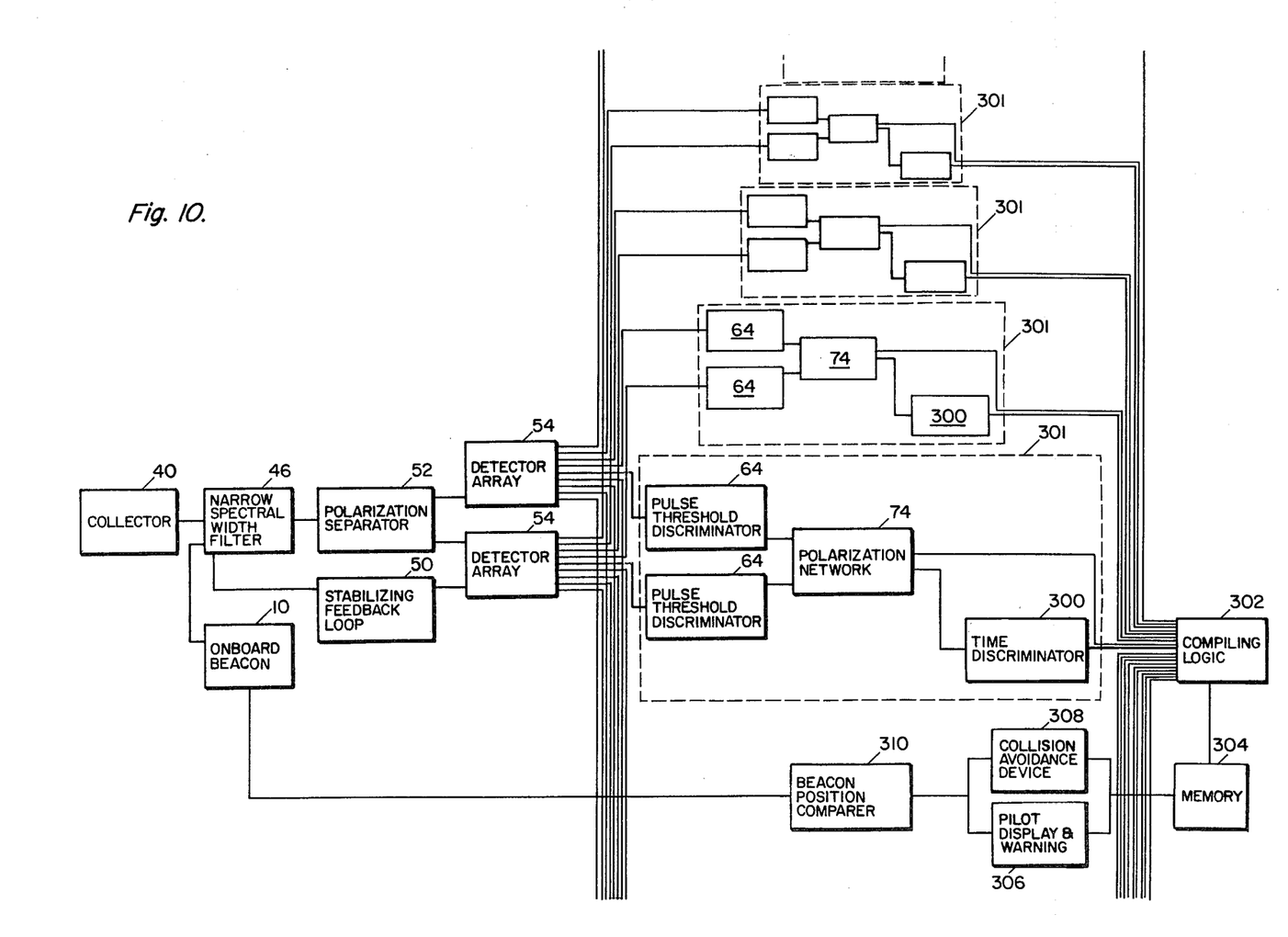
FIG. 10 is a block diagram of a second embodiment of the optical detection apparatus which is somewhat simplified from the preferred embodiment.

A second embodiment of the optical detection device 18 takes advantage of the fact that the time in which a collimated beam sweeps past a single collector 40 is inversely proportional to the distance of that collector 40 from the beam source 10, assuming a constant angular scan rate. Thus with even a single collection channel, range information can be determined. This embodiment is less accurate than the preferred embodiment previously discussed since range information is less certain than if two horizontally offset collectors are used. The basic layout is similar to a single channel of the preferred embodiment. A block diagram of this simpler embodiment is shown in FIG. 10. According to that embodiment a single collector 40 passes the light into a narrow linewidth filter 46 which as before is stabilized with light from the onboard laser beacon 10 and a feedback loop 50. Filter 46 is followed by a polarization separator 52 and detector arrays 54 and 56 for each polarization component. Any given sector of the sky is simultaneously observed by one element each of array 54 and 56. The two orthogonal polarization signals from each sector are collected together and fed into an associated signal processor 301. Within the signal processor 301 each signal is passed through a pulse threshold discriminator 64 and the two polarization outputs are compared by the polarization network 74. At this point the signal is passed into a time discriminator network 300 where the pulse "on" time or rise time $\Delta t$ is measured. The polarization and $\Delta t$ information from each signal processor 301 is fed into compiling logic 302 which determines the threat aircraft 14 range from the inverse of $\Delta t$. the threat aircraft 14 heading from the polarization, and the threat aircraft 14 bearing from the sector of the sky from which the signal came. This information is then stored in a memory 304 so it can be compared with a pulse from the next observed sweep approximately one second later. Display and warning devices 306 or a collision avoidance system 308 may then be activated. It is a further feature of this embodiment that a reflection of the onboard laser beacon 10 from a retroreflector can be identified and monitored as if it were a threat aircraft. By comparing signals from the onboard transmitter beacon 10 with signals from the retroreflector in a beacon position comparator 310 it is possible to identify signals from retroreflectors if such is of interest.

Figure 11:
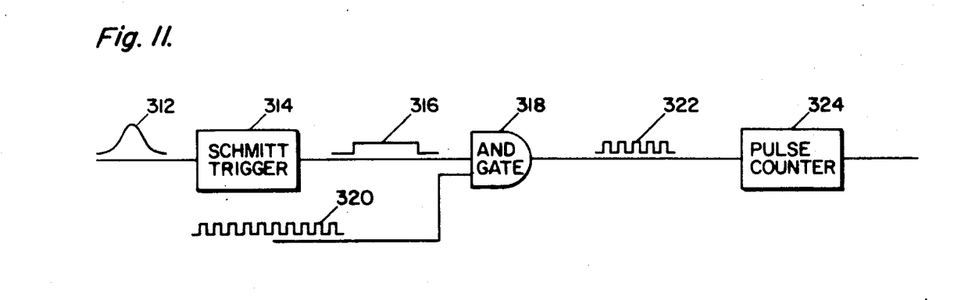
FIG. 11 is a detail diagram of the time discriminator network.

An example of a time discriminator network 300 is shown in FIG. 11. The pulse input 312 passes into a Schmitt trigger 314 which switches on at the beginning of the pulse and off at the end. The Schmitt trigger 314 output 316 is a rectangular shaped pulse with an "on" time equal to the "on" time of the input pulse 312. This output 316 is passed into an AND gate 318 whose other input 320 is a clock pulse train. The AND gate 318 only gives an output when both inputs are "on", so the AND gate output 322 is a pulse train with the number of pulses determined by the input pulse 312 length. A pulse counter 324 then directly yields the input pulse 312 "on" time.

Figure 12:
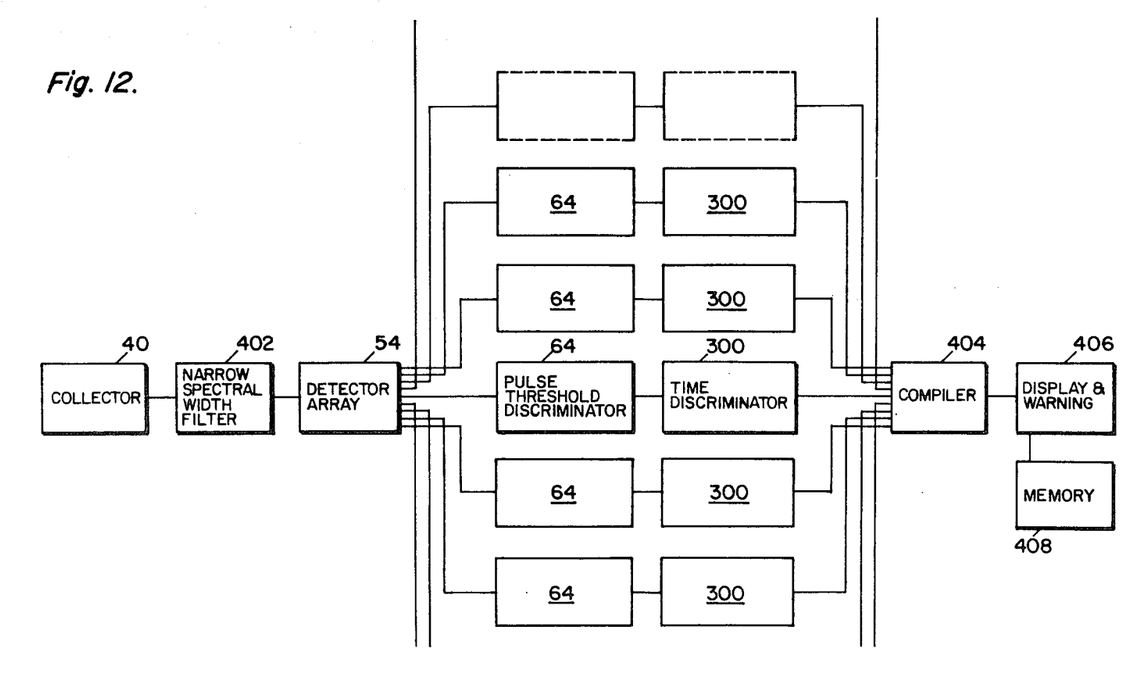
FIG. 12 is a block diagram of a third embodiment of the optical detection apparatus which is a further simplified configuration.

A third embodiment of the optical collection apparatus is shown in the block diagram of FIG. 12. An optical collector 40 passes the light into a narrow spectral linewidth filter 402. Filter 402 contains only a passive device 114 which requires no feedback loop for alignment. Filter 402 is followed by a detector array 54 each element of which feeds its signal into a pulse threshold discriminator 64. The outputs of discriminators 64 are fed into a time discriminator 300. The output of the time discriminator 300 associated with each detector element is then fed to a compiler 404 followed by a pilot warning and display unit 406 which indicates to the pilot the relative bearing of traffic within a given range. In addition, a memory unit 408 may be provided and coupled to the warning and display device 412 so that only those signals which repeat at approximately one second intervals are considered.

The invention has been described in the context of an aircraft collision hazard determination system. It will be appreciated, however, that the general teaching of the invention can be applied to other environments. For example the invention could be employed in a marine environment between ships or between a ship and an aircraft. Alternatively, the beacon or the detector could be stationary with respect to its surroundings such as would be the case if the laser beacon were a navigational light or lighthouse and the detector were mounted on a ship or aircraft.

While the invention has been described with reference to the preferred embodiment thereof it will be appreciated by those of ordinary skill in the art that various changes may be made to the structure and function of the parts without departing from the spirit and scope of the basic invention.

I claim:

1. An aircraft collision hazard determination system comprising:

laser beacon means mountable on a first aircraft including a laser light source which emits a polarized beam of light, expanding means for optically expanding said beam into a vertically diverging and horizontally collimated fan-shaped beam, means for sweeping said fan-shaped beam 360° in azimuth while simultaneously rotating said beam 360° in polarization; and, a pair of optical detection means mountable on a second aircraft for detecting light from said laser beacon means including means for detecting different polarized components of the light and converting said components into electronic signals proportional thereto, means for electronically processing said polarized components to produce a signal indicative of the polarization of the light, and means for comparing the detected polarization from each of said optical detection means to verify the consistency of the polarization of the light thereby reducing false signals.

2. An aircraft collision hazard determination system comprising:

laser beacon means mountable on a first aircraft including a laser light source, a laser beam expander and collimator means for producing a beam which diverges vertically but remains horizontally collimated with substantially no divergence over the range of the system, and means for sweeping said vertically diverging and horizontally collimated beam 360° in azimuth; and an optical detection means mountable on a second aircraft including light sensitive detector means for converting the light from said beacon means into an electronic signal, electronic means for measuring the pulse shape characteristic as a function of time of said electronic signal, and logic means for converting said pulse shape characteristic as a function of time into a signal indicative of the distance of said laser beacon means from said optical detection means.

3. The system of claim 2 wherein said optical detection means further includes a narrow width spectral filter means actively locked to the frequency of said laser beacon means.

4. An aircraft collision hazard determination system comprising:

optical beacon means mountable on a first aircraft including a light source which emits a polarized beam of light, expanding means for optically expanding said beam into a vertically diverging and horizontally collimated fan-shaped beam, means for sweeping said fan-shaped beam 360° in azimuth while simultaneously rotating said fan-shaped beam 360° in polarization; and, optical detection means mountable on a second aircraft for detecting light from said optical beacon means including means for detecting different polarized components of said light and converting them into electronic signals, means for electronically processing the electronic signals indicative of said polarized components to produce a signal indicative of the polarization of said light, and logic means for converting the signal indicative of the polarization into information indicative of the bearing of said second aircraft from said first aircraft.

5. A method for detecting range comprising the steps of:

producing a laser beam;
   expanding said laser beam into a beam which remains horizontally collimated with substantially no divergence over its desired range;
   producing a beacon by sweeping said beam 360° in azimuth;
   collecting the observed pulse of light from said beacon;
   converting the light pulse into an electronic signal;
   determining the pulse shape characteristic as a function of time of said electronic signal; and,
   converting said pulse shape characteristic as a function of time into a range measurement.

6. A method for detecting bearing from a beacon comprising the steps of:

producing a polarized light beam;
   producing a beacon by sweeping said light beam 360° in azimuth while simultaneously rotating it 360° in polarization;
   collecting the observed pulse of light from said beacon;
   detecting at least two different polarization components of the light; and,
   converting the polarization components into a signal indicative of the bearing from said beacon.

7. An optical beacon and detection system comprising:

laser beacon means including a laser light source for producing a laser beam, means for expanding and collimating the laser beam emitted from said laser light source such that said beam remains collimated with substantially no divergence over the range of the system, and means for sweeping said collimated beam 360° in azimuth; and, optical detection means for observing light from said laser beacon means including light sensitive detector means for converting the observed pulse of light from said beacon means into an electronic signal; electronic means for measuring the pulse shape characteristic as a function of time of said electronic signal, and logic means for converting said pulse shape characteristic as a function of time into a signal indicative of the distance of said laser beacon means from said optical detection means.

8. An optical beacon and detection system comprising:

beacon means including a light source which emits a polarized beam of light, means for sweeping said beam 360° in azimuth while simultaneously rotating said beam 360° in polarization; and optical detection means including means for detecting at least two different polarized components of the light from said beam, means for electronically processing the detected polarized components to produce polarization information indicative of the polarization of the detected light, and means for converting said polarization information into a signal indicative of the bearing of said optical detection means from said beacon means.

* * * * *